(12) United States Patent
Quiring

(10) Patent No.: US 9,737,070 B1
(45) Date of Patent: Aug. 22, 2017

(54) CABLE FOR CLIMBING TREE STAND

(71) Applicant: Brent G. Quiring, Windom, MN (US)

(72) Inventor: Brent G. Quiring, Windom, MN (US)

(73) Assignee: Outdoor Technology Group, LLC, Windom, MN (US)

( * ) Notice: Subject to any disclaimer, the term of this patent is extended or adjusted under 35 U.S.C. 154(b) by 0 days.

(21) Appl. No.: 15/005,525

(22) Filed: Jan. 25, 2016

Related U.S. Application Data

(60) Provisional application No. 62/107,944, filed on Jan. 26, 2015.

(51) Int. Cl.
*A01M 31/02* (2006.01)
*A63B 27/00* (2006.01)

(52) U.S. Cl.
CPC ............. *A01M 31/02* (2013.01); *A63B 27/00* (2013.01)

(58) Field of Classification Search
CPC ..................................................... A01M 31/02
See application file for complete search history.

(56) References Cited

U.S. PATENT DOCUMENTS

| | | | |
|---|---|---|---|
| 5,234,077 A | 8/1993 | Sheriff | |
| 5,265,780 A * | 11/1993 | Matthews | A45F 4/02 182/133 |
| 5,471,904 A * | 12/1995 | Armstrong | F41A 9/57 193/25 AC |
| 5,975,242 A * | 11/1999 | Woller | A01M 31/02 182/135 |
| 6,308,800 B1 | 10/2001 | Graham, Jr. | |
| 6,986,404 B1 | 1/2006 | Laborde | |
| 7,891,465 B1 * | 2/2011 | Paul | A01M 31/02 182/136 |
| 2006/0272898 A1* | 12/2006 | Hovey | A63B 27/00 182/135 |
| 2010/0126803 A1 | 5/2010 | Cama | |
| 2010/0320031 A1* | 12/2010 | Weber | A01M 31/02 182/187 |
| 2012/0080268 A1* | 4/2012 | Bedell | A01M 31/02 182/134 |
| 2016/0029617 A1* | 2/2016 | Lee | A01M 31/02 182/133 |

* cited by examiner

*Primary Examiner* — Alvin Chin-Shue
(74) *Attorney, Agent, or Firm* — Kagan Binder, PLLC

(57) ABSTRACT

Designs for a flexible component to be wrapped around a tree as part of a tree stand is provided. Designs of the present invention utilize a length or loop of cable. Segments are threaded onto the cable for the entire length. Significant features of flexible components of the present invention include the provision of adequate tensile strength to support the weight of the stand and the user. The flexible component is preferably flexible so it can wrap around the tree, but yet it preferably is also rigid enough so it does not sag when pressure is removed. It preferably also can be easily adjustable to easily accommodate different size trees.

17 Claims, 4 Drawing Sheets

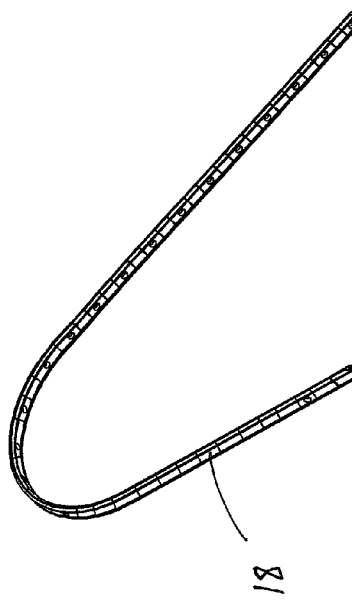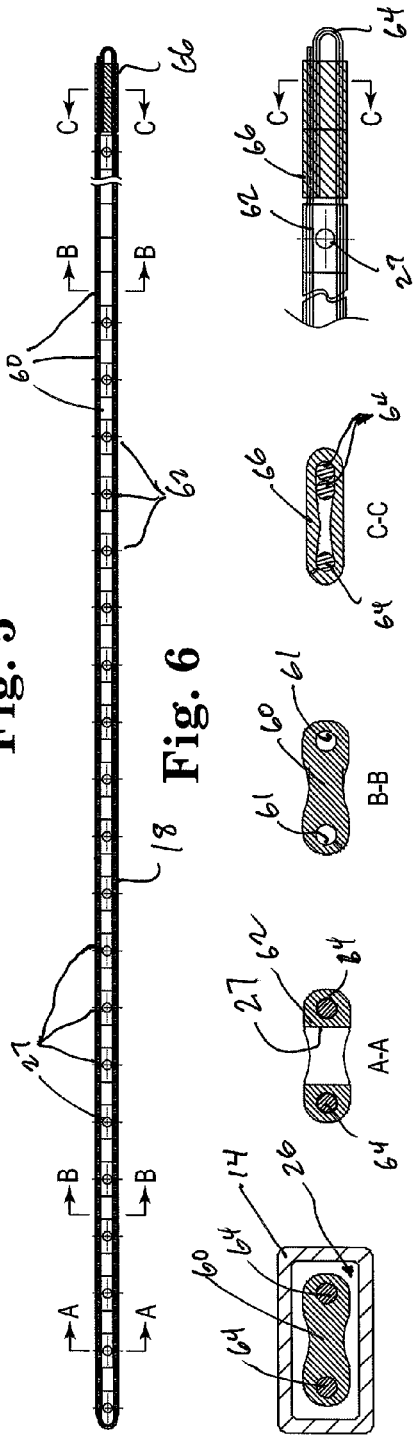

CABLE FOR CLIMBING TREE STAND

CROSS REFERENCE TO RELATED APPLICATION

This application claims the benefit under 35 U.S.C. §119(e) of U.S. Provisional Patent Application No. 62/107,944, filed Jan. 26, 2015 and titled "CABLE FOR CLIMBING TREE STAND", which is incorporated herein by reference in its entirety.

FIELD OF THE INVENTION

The present invention relates to tree stands as may be used to gain a height advantage for hunting game.

BACKGROUND OF THE INVENTION

Tree stands have been developed to provide easier, safe and comfortable access to elevated vantage points within a tree. Such tree stands are typically used for hunting or observing nature from a higher elevation than the ground for improved target vision.

One type of tree stand is a climbing tree stand that can be manipulated by a user to incrementally climb a tree or similar post structure. Such climbing tree stands generally utilize a similar concept and comprise both a top section or seat platform and a bottom section or foot platform. The seat platform and foot platform typically each include a tree engaging portion and either a rigid back bar or a flexible strap member for wrapping around the tree and to hold the platforms in vertical positions on the tree. Such a back bar or flexible strap are typically provided as adjustable to accommodate trees within a range of diameters.

To use a typical climbing tree stand, a user starts near the base of a tree and installs both sections by engaging each platform with the tree and wrapping the flexible strap or positioning the rigid back bar around the tree. The strap or back bar is secured to the platform after it is adjusted to accommodate the tree diameter. In the case of a strap, one end of the strap can be secured to one side of the platform at one of plural connection points to provide the adjustability. With a rigid back bar, the bar ends can telescope within structure of the platform for adjustability. Once the platforms are secured in a position along a tree with the seat platform above the foot platform, a climbing operation can commence. A user stands on the foot platform facing the tree and attaches his/her feet to the foot platform with a strap. The user tips the seat platform up in front thus removing pressure and slides the seat platform a distance up the tree. The user can then sit on a front portion of the seat platform. This downward pressure locks the seat platform in place. The user can then tip a front of the foot platform by lifting his/her heels as the user faces the tree so as to remove downward pressure. The user can thus lift the foot platform by lifting his/her feet while keeping his/her heels up. The user stands on the foot platform. This pressure locks the foot platform in place. This action is continued until the desired height is reached.

As to flexible straps for wrapping around a tree, metal cables, rubber belts and roller chains have been used that are typically permanently attached at one side of each of the seat and foot platforms and adjustably attached at the other side of each of the seat and foot platforms. As above, this adjustability allows for supporting the platforms on a range of tree diameters. Roller chains provide sufficient strength for supporting the platforms and a user's weight and provide flexibility along its length generally within a single plane, which allows the roller chain to wrap around a tree. Roller chains, however, do not slide up a down a tree's bark surface easily as the links tend to catch on the uneven surfaces of the tree bark. Likewise, a flexible rubber belt, similar to a snowmobile drive belt material, can provide sufficient strength and flexibility if wide enough, but such belts can be cumbersome during climbing and difficult to slide along the tree's bark surface. Unlike a roller chain, belts can also twist and flex transversely when attempting to slide the belt along a tree surface as such belts are flexible in more than a single plane. Metal cables made up of twisted metal strands or the like also provide sufficient strength and flexibility to wrap around a tree's surface and support a platform and user. Metal cables typically can slide along the tree surface easier than roller chains and belts, but cables can be too flexible along its length in all directions such that it is difficult to slide the cable along the tree by lifting upward on a platform. Moreover, during a platform lift step, cables are not sufficiently rigid so as not to sag when pressure is removed. Roller chains and belts better tend to hold their shape when an upward force is provided to a platform so that the chain or belt is moved along the tree surface along with the platform while maintaining their shape and the angle of attachment to the platforms. Maintaining this angle of attachment is important to providing adequate support without downward sliding of the platform. Rigid back bars are advantageous over flexible roller chains, belts and cables in this aspect. Rigid back bars, however, are not nearly as adjustable to fit different size trees and add unnecessary weight to the tree stand.

SUMMARY OF THE INVENTION

The present invention is directed to a new design for a flexible component to be wrapped around a tree as part of a tree stand. Designs of the present invention utilize a length or loop of cable. Segments are threaded onto the cable for the entire length.

Significance features of flexible components of the present invention include the provision of adequate tensile strength to support the weight of the stand and the user. The flexible component is preferably flexible so it can wrap around the tree, but yet it preferably is also rigid enough so it does not sag when pressure is removed. It preferably also can be easily adjustable to easily accommodate different size trees.

In one aspect, the present invention is directed to a climbing tree stand that includes a seat platform including a tree engaging portion and a pair of structural support arms extending at a desired angle from the seat platform at two spaced locations, and a first flexible component that is operatively connected to one arm of the seat platform and adjustably connectable with the other arm, the first flexible component comprising a first inner cable onto which a plurality of rigid segments are threaded, wherein the segments are sufficiently connected with the first inner cable to allow for the flexible component to be flexible in a desired plane but otherwise sufficiently rigid for substantially maintaining the flexible component at the desired angle of the arms to the seat platform.

Preferably, the flexible component comprises a combination of holed and non-holed segments arranged along the first inner cable. One of the arms can include an internal passage within which an end portion of the flexible component can slide for providing an adjustable connection between the flexible component and the arm, the arm can also be operatively connected with a movable element to selectively engage with a segment of the first flexible component. More preferably, the arms are each pivotally connected with the seat platform and a further structural support is connected between the seat platform at a spaced location from the arms and ends of the arms for maintaining the arms at the desired angle from the seat platform. Also, the further structural support can be pivotally connected with the ends of the arms and is detachably connected with the seat platform to allow the arms and further structural support to collapse relative to the seat platform when detached. The inner cable can be threaded to run through each of the segments of the first flexible component more than once and the inner cable can be connected to an end segment provided at one end of the first flexible component at each end of the first inner cable.

In another aspect, the present invention is directed to a tree stand including a combination of a seat platform including a tree engaging portion and a pair of structural support arms extending at a desired angle from the seat platform at two spaced locations, a first flexible component that is operatively connected to one arm of the seat platform and adjustably connectable with the other arm, the first flexible component comprising a first inner cable onto which a plurality of rigid segments are threaded, wherein the segments are sufficiently connected with the first inner cable to allow for the flexible component to be flexible in a desired plane but otherwise sufficiently rigid for substantially maintaining the flexible component at the desired angle of the arms to the seat platform, a foot platform including a tree engaging portion and a pair of structural support arms extending at a desired angle from the seat platform at two spaced locations, and a second flexible component that is operatively connected to one arm of the foot platform and adjustably connectable with the other arm, the second flexible component comprising a second inner cable onto which a plurality of rigid segments are threaded, wherein the segments are sufficiently connected with the second inner cable to allow for the flexible component to be flexible in a desired plane but otherwise sufficiently rigid for substantially maintaining the flexible component at the desired angle of the arms to the foot platform.

In yet another aspect, the present invention is directed to a method of making a tree stand comprising the steps of operatively connecting a seat platform including a tree engaging portion to a pair of structural support arms while extending the arms from the seat platform at two spaced locations; threading a plurality of rigid segments onto a first inner cable to create a first flexible component, wherein the segments are sufficiently connected with the first inner cable to allow for the first flexible component to be flexible in a desired plane but otherwise sufficiently rigid for substantially maintaining the first flexible component at a desired angle; and attaching a first end of a first flexible component to one arm of the seat platform and adjustably connecting a second end of the first flexible component with the other arm.

Such a method of the present invention can further include the steps of operatively connecting a foot platform including a tree engaging portion to a pair of structural support arms while extending the arms from the foot platform at two spaced locations; threading a plurality of rigid segments onto a second inner cable to create a second flexible component, wherein the segments are sufficiently connected with the second inner cable to allow for the second flexible component to be flexible in a desired plane but otherwise sufficiently rigid for substantially maintaining the second flexible component at a desired angle; and attaching a first end of a second flexible component to one arm of the foot platform and adjustably connecting a second end of the second flexible component with the other arm.

BRIEF DESCRIPTION OF THE SEVERAL VIEWS OF THE DRAWINGS

Other important objects and advantages of the present invention will be apparent from the following detailed description of the invention taken in connection with the accompanying drawings in which;

FIG. 5 is a perspective view of a flexible component of the present invention with the flexible component comprising holed segments and non-holed segments and being flexed for use with a tree stand of the present invention;

FIG. 6 is a side view of an unflexed flexible component of the present invention comprising holed and non-holed segments along with an end segment;

FIG. 7 is cross sectional view of a non-holed segment of the flexible component as such segment is positioned within a passage of an arm element as part of supporting structure for a seat platform;

FIG. 8 is a cross sectional view of a holed segment of a flexible component of the present invention taken along line A-A of FIG. 6;

FIG. 9 is a cross sectional view of a non-holed segment of a flexible component of the present invention taken along line B-B of FIG. 6;

FIG. 10 is a cross sectional view of an end segment of a flexible component of the present invention taken along line C-C of FIG. 6 and showing a flexible internal cable of the flexible component of the present invention as positioned and swaged within an end segment; and FIG. 11 is an enlarged view of an end portion of the flexible component of FIG. 6, partially in longitudinal cross section, showing a routing of a flexible internal cable within the end segment as the ends of the cable are swaged within the end segment.

DETAILED DESCRIPTION OF THE INVENTION

The following specific embodiments of the present invention and as described within the specification herein are for illustrative purposes only. Various deviations and modifications may be made within the spirit and scope of the invention without departing from the main theme thereof.

Figure 1:
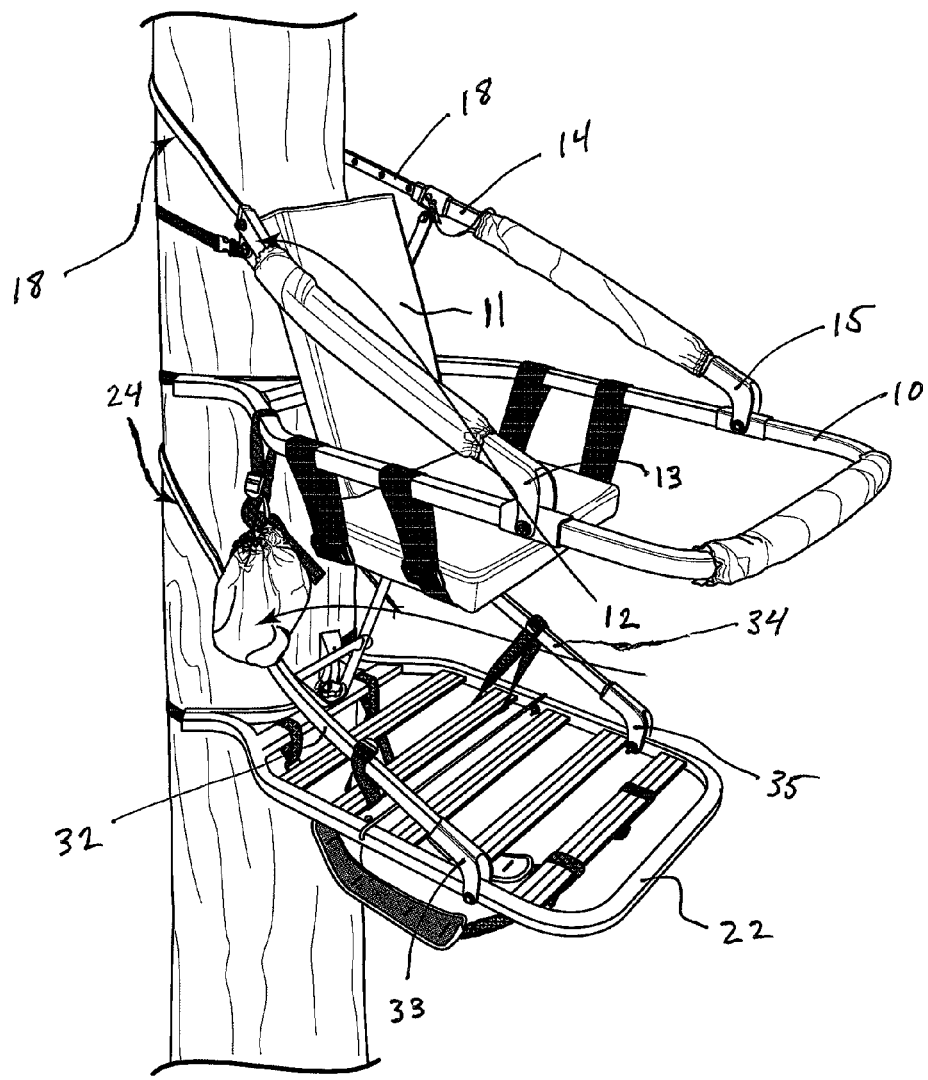
FIG. 1 is a perspective view of a climbing tree stand in accordance with the present invention comprising separately movable seat and foot platforms.

As shown in FIG. 1, a climbing tree stand is provided in accordance with the present invention as comprising a seat platform 10 and a foot platform 22. Each of the seat platform 10 and the foot platform 22 are illustrated as being operatively connected, respectively, with flexible cable components 18 and 24, in accordance with the present invention for replacing the flexible belts and chains of the prior art or a rigid back bar. The platforms can be manipulated to climb as described within the Background section above and in a similar manner as those of the prior art. For example, U.S. Pat. Nos. 6,986,404; 6,308,800; 5,234,077 and publication no. 2010/126803 shown climbing tree stands, the entire contents of each being fully incorporated herein by reference.

By the present invention, instead of sliding a roller chain, flexible belt, rigid back bar, or cable along a tree bark surface, the flexible cable components 18 and 24 of the present invention are used. The flexible cable components 18 and 24 advantageously can be controllably flexible within a plane and can provide sufficient strength for supporting the platforms 10 and 22 along with a user's weight. The flexibility of each flexible component 18 and 24 preferably allows the flexible components to wrap around trees of a range of sizes. Moreover, by the design of such flexible components 18 and 24 of the present invention, described below, the flexible components 18 and 24 slide more easily up and down a tree's bark surface as the components can slide along the uneven surfaces of tree bark. Also advantageously, the flexible components 18 and 24 of the present invention are designed to hold their shape when an upward force is provided to a platform 10 or 22 so that the flexible component 18 or 24, respectively, is moved along the tree surface along with the platform while maintaining their shape and the angle of attachment to the platforms 10 and 22. Maintaining this angle of attachment is important to providing adequate support without downward sliding of the platform. The angle of the extension of the flexible components 18 and 24 with respect to the respective platform 10 or 22 is preferably determined based upon the ability to support the platforms 10 and 22 is position based upon a downward force as applied to the platforms 10, 22. Maintaining that angle during repositioning steps of the platforms 10, 22 is advantageous to a smooth climbing operation.

Figure 3:
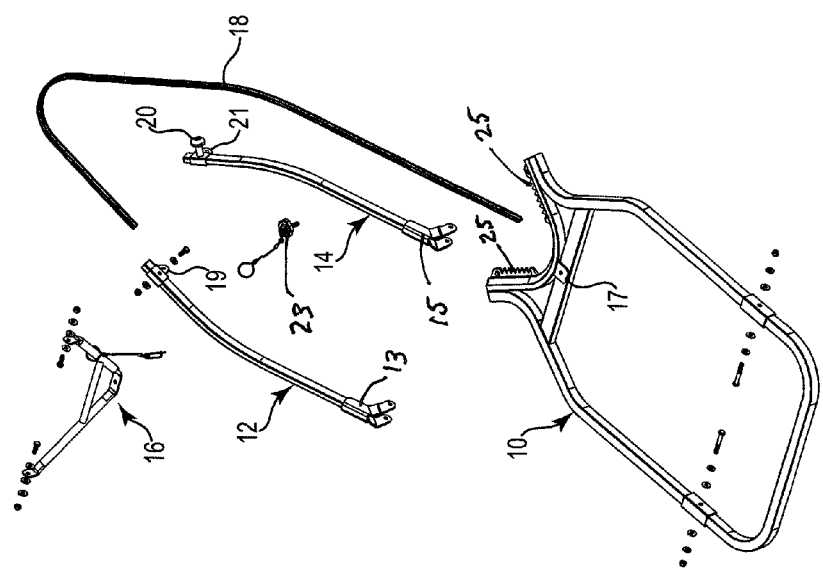
FIG. 3 is an exploded perspective view of seat platform including a flexible component system in accordance with the present invention.

FIG. 3 shows an embodiment of the present invention for a construction of the seat platform 10 onto which a flexible seat 11 (see FIG. 1), as known, can be supported to the platform 10. Any seat shape and construction is contemplated, although it is preferable that the seat 11 be collapsible along with each of the platforms 10 and 22 for storage and transport. In the illustrated construction, arms 12 and 14 are pivotally connected to the sides of the platform 10 by brackets 13 and 15, respectively. The arms 12 and 14 could instead be fixed in position to the seat platform 10 if collapsibility of the platform components is not desired.

A support 16 connects between a point 17 of the seat platform and points 19 and 21 of the arms 12 and 14, respectively for fixing the arms 12 and 14 at a desired angular relationship to the platform 10. This angle also facilitates the preferred angle for the flexible component 18 to adjustably extend from the arms 12 and 14. The construction of the support 16 and connection points 17, 19 and 21, respectively, with the seat platform 10 and arms 12 and 14 can be varied. The purpose of the support 16 is to fix the arms 12 and 14 at a preferred angle with respect to the seat platform 10. The connections at points 19 and 21 can be selectively coupled or uncoupled or they can be permanently fixed depending on whether it is desired for the platform 10 and arms 12 and 14 to be collapsible or not. Conventional connectors are illustrated for the connection points of the platform 10, brackets 13 and 15, the support 16 and the arms 12 and 14. These connections are preferably removable to allow collapse of the components to one another. Quick connect and disconnect pins or the like are also contemplated for easy set up and collapse. For example, a threaded knob 23 is shown in FIG. 3 for securing the support 16 to the platform 10 at connection point 17. The knob 23 allows a user to easily disconnect the support 16 from the platform 10 and the pivotal connections to the arms at 19 and 21 and to the platform 10 at brackets 13 and 15 then allow the support arms 12 and 14 and the support 16 to collapse to the platform 10.

Seat platform 10 also preferably is shaped at one end thereof for tree engagement. Preferably, the platform 10 is shaped in that portion to partially encircle or surround a tree during use. To facilitate gripping of the platform 10 with a tree, tree engagement elements 25 are preferably positioned along the tree engagement end of the platform 10, which elements can comprise a plate having a series of tree engaging spikes. The tree engagement elements can comprise other known or developed designs, the purpose of which is to dig into the tree bark when a downward force is applied to the seat platform 10 during climbing and in use.

Figure 2:
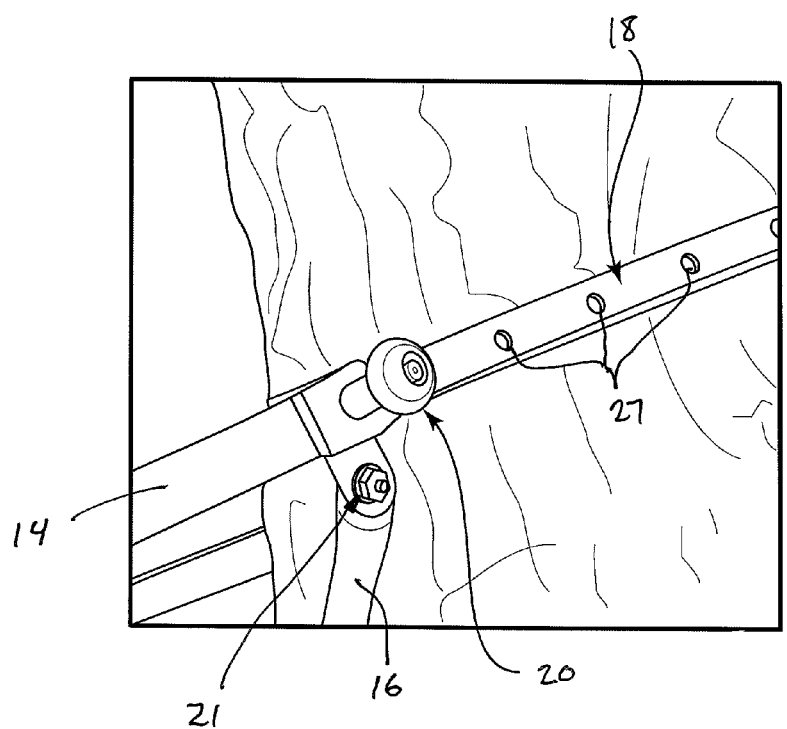
FIG. 2 is an enlarged perspective view showing a connection between a spring loaded connection pin and a flexible component of the present invention.

FIG. 2 illustrates a connection at 21 between the support 16 and a top portion of the arm 14. The end of the arm 14 preferably includes a receiver opening for a passage 26 (see FIG. 7) that extends within and along the arm 14 into which a portion of a flexible component 18 of the present invention can slide. This connection allows a spring loaded pin 20 to insert into any selected opening 27 as are provided along the flexible component 18 for adjustability of the flexible component 18 around trees of different sizes. A user can pull the pin 20 against a spring force, as such spring loaded pins are known, and slide the flexible component 18 to a desired position within the passage of the arm 14 and then release the pin so that the spring bias locates the pin 20 within the selected opening 27 of the flexible component 18.

One end of the cable 18 is preferably connected to an end of the arm 12, such as by a conventional bolt and nut assembly. The other end of the cable 18 is preferably fed within an internal space extending longitudinally within the arm 14. As above, this end of the cable is connected to the arm 14 by selective activation and positioning of a spring loaded pin 20. The cable 18 is preferably of a sufficient length to accommodate a variety of tree sizes, which can be varied for different products.

Figure 4:
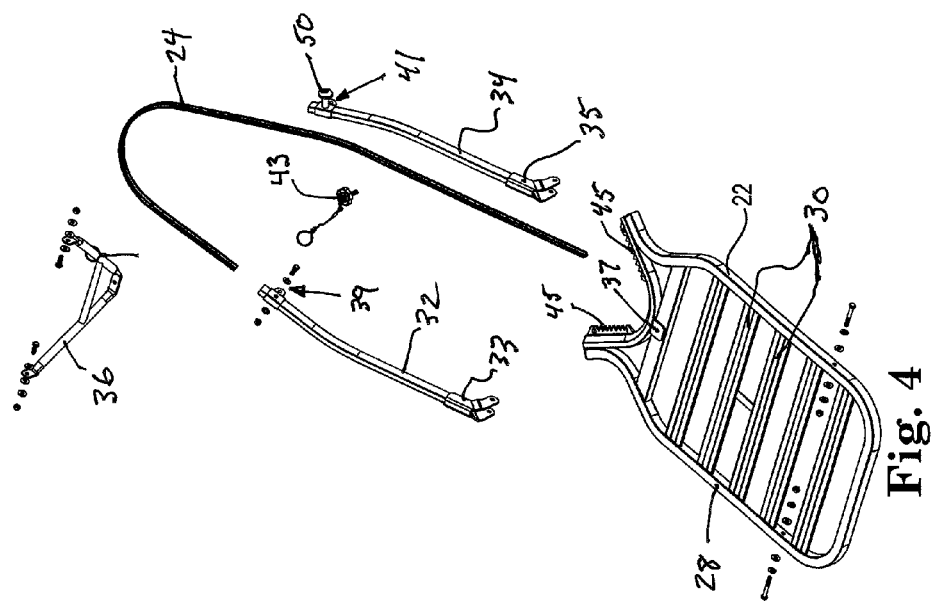
FIG. 4 is an exploded perspective view of a foot platform including a flexible component system of the present invention.

The foot platform 22 can be similarly constructed. Referring to FIG. 4, a construction of the foot platform 22 is shown. The foot platform is shown as including a frame 28 and a plurality of fixed slats 30. Other configurations are contemplated. In the illustrated construction, arms 32 and 34 are pivotally connected to the sides of the platform 22 by brackets 33 and 35, respectively. The arms 32 and 34 could instead be fixed in position to the seat platform 22 if collapsibility of the platform components is not desired.

A support 36 connects between a point 37 of the foot platform 22 and points 39 and 41 of the arms 32 and 34, respectively for fixing the arms 32 and 34 at a desired angular relationship to the platform 22. This angle also facilitates the preferred angle for the flexible component 24 to adjustably extend from the arms 32 and 34. The construction of the support 36 and connection points 37, 39 and 41, respectively, with the seat platform 22 and arms 32 and 34 can be varied. The purpose of the support 36 is to fix the arms 32 and 34 at a preferred angle with respect to the seat platform 22. The connections at points 39 and 41 can be selectively coupled or uncoupled or they can be permanently fixed depending on whether it is desired for the platform 22 and arms 32 and 34 to be collapsible or not. Conventional connectors are illustrated for the connection points of the platform 22, brackets 33 and 35, the support 36 and the arms 32 and 34. These connections are preferably removable to allow collapse of the components to one another. Quick connect and disconnect pins or the like are also contemplated for easy set up and collapse. A threaded knob 43 is shown in FIG. 3 for securing the support 36 to the platform 22 at connection point 37. The knob 43 allows a user to easily disconnect the support 36 from the platform 22 and the pivotal connections to the arms at 39 and 41 and to the platform 22 at brackets 33 and 35 then allow the support arms 32 and 34 and the support 36 to collapse to the platform 22.

Seat platform 22 also preferably is shaped at one end thereof for tree engagement. Preferably, the platform 22 is shaped in that portion to partially encircle or surround a tree during use. To facilitate gripping of the platform 22 with a tree, tree engagement elements 45 are preferably positioned along the tree engagement end of the platform 22, which elements can comprise a plate having a series of tree engaging spikes. The tree engagement elements can comprise other known or developed designs, the purpose of which is to dig into the tree bark when a downward force is applied to the seat platform 22 during climbing and in use.

Like that illustrated in FIGS. 2 and 7, the end of the arm 34 preferably also includes a receiver opening for a passage 26 that extends within and along the arm 34 into which a portion of a flexible component 24 of the present invention can slide. This connection allows a spring loaded pin 50 to insert into any selected opening 27 as are provided along the flexible component 24 for adjustability of the flexible component 24 around trees of different sizes. A user can pull the pin 50 against a spring force, as such spring loaded pins are known, and slide the flexible component 24 to a desired position within the passage 27 of the arm 34 and then release the pin so that the spring bias locates the pin 50 within the selected opening 27 of the flexible component 24.

One end of the flexible component 24 is preferably connected to an end of the arm 32, such as by a conventional bolt and nut assembly. The other end of the flexible component 24 is preferably fed within the internal passage 27 extending longitudinally within the arm 34. As above, this end of the flexible component is connected to the arm 34 by selective activation and positioning of a spring loaded pin 50. The flexible component 24 is preferably of a sufficient length to accommodate a variety of tree sizes, which can be varied for different products.

As shown in FIG. 5, the flexible component 18, 24 preferably comprises a plurality of metal segments, such as comprising segments 60 and holed segments 62. These segments 60 and 62 can comprise aluminum extrusion pieces, although other metals and plastics and the like are contemplated. Any number of segments 60 and 62 can be utilized of one or more lengths, but it is preferably to keep the segment lengths short enough to provide a desired level of flexibility to easily wrap around a tree trunk. A length of about 30 mm is preferred for typical tree size design. The segments 60 and 62 are preferably shaped to facilitate flexibility of the flexible component 18, 24 in a single plane while maintaining its shape with minimal sag in other off-plane directions. Specifically, it is desirable that the flexible component 18, 24 does not sag significantly so that the shape of the flexible component 18, 24 does not significantly change. Moreover, the flexible component 18, 24 should have sufficient tensile strength to support the weight of a user along with the weight of the stand.

Each segment can be provided with one or more bores 61 for receiving a flexible cable 64. This flexible cable 64 is important in providing the needed tensile strength to the flexible components 18, 24 in order to support the weight of a user along with the weight of the stand. In a preferred embodiment, a steel braided cable of less than 0.125 inch is threaded as the cable 64 through a bore of 0.125 inch of the segments 60, 62 to create a flexible component 18, 24 for supporting the seat and foot platforms of the present invention. Each segment 60, 62 is preferably spaced just slightly from an adjacent segment 60, 62 to allow for the desired flexibility. The steel cable length and spacing aspects can be determined empirically based upon desired flexibility and the ability of the flexible component 18, 24 to substantially hold its shape during a climbing operation. That is, it is desirable for the flexible component 18, 24 to substantially maintain the desired angle with the seat and/or foot platforms 10, 22 while climbing so that the segments 60, 62 and thus the flexible component 18, 24 slide along the tree trunk.

Preferably, the segments 60, 62 comprise a smooth shape and material to facilitate sliding along a tree surface. Segments 60, 62 having a greater width (as viewed in FIGS. 8 and 9) than height are preferred. The relatively shorter height dimension more easily allows for the desired flexible component 18, 24 to have flexibility in a single plane, while the greater width dimension prevents movement out of plane. These dimensions and shapes of the segments can be varied based upon design criteria including expected tree diameters. The smaller the tree diameter, the greater is the need for flexibility in the single plane. The desired level of flexibility and thus each of the segment designs can be determined empirically based upon segment sizes and the spacing between segments as determined by the length of the flexible cable 64. As above, an aluminum or other material extrusion having a desired width and height and preferably also having one or more bores for receiving the flexible cable 64 can be utilized. As an extrusion, holes 27 can be drilled at spaced locations, and the extrusion can simply be cut into desired segment lengths providing segments 60 without holes and segments 62 with holes located as desired. Aluminum or another light weight metal is preferred for the segments 60, 62, although other materials including plastics, ceramics, or the like can be used. Holed segments 62 need not be provided within all of the length of the flexible component 18, 24 and may only be provided in the portion of the flexible component 18, 24 that is needed for adjustment for a range of tree sizes (like a belt for clothing).

In order to set the segment spacing, the ends of the steel cable 64 can be connected with a final segment 66 on each side of the cable 66 by conventional means, such as by a swaging technique.

As shown by the cross sectional drawings of FIGS. 8-11, it is preferable that the flexible inner cable 64 be threaded through each segment 60, 62 at plural spaced points, the spacing being in the width direction of the segments 60, 62. As shown, the inner cable 64 can travel through the plural segments 60, 62 along one side thereof and then be returned to travel back through the plural segments 60, 62 along another side of each segment 60, 62. Such an arrangement can include a loop at one end of the cable 64 where the cable 64 turns back into the same end segment. At the other end, see FIGS. 10 and 11, the cable 64 can be run back into an end segment 66 and swaged in place. The cross section of FIG. 8 shows a cross through an opening 27 of a segment 62 of the flexible component 18, 24. FIG. 9, shows a cross section through a solid portion of a segment 60, and FIG. 10 shows a cross at an end segment 66 swaged to the flexible cable 64 at three points. The swaging or other functionally equivalent manner of defining the length of the flexible cable 64 relative to the segments 60, 62 sets the length, segments spacing, and flexibility of each flexible component 18, 24, as described above.

In FIG. 11, the flexible cable 64 is shown in an example of cable routing with both end portions of the cable 64 within the end segment 66. In this example, the cable 64 runs from the end segment 66 through all of the other segments 60, 62, then turns back at the distal end of the flexible component 18 and again runs all the way through the segments 60, 62. Also in this example, the end of the cable 64 is then turned back into the end segment 66 and terminated within the end segment. That way, the cable 64 can be swaged with the end segment 66 by partial compression of the end segment 66 to frictionally secure the cable 64 with the end segment 66 at three locations, as shown in FIG. 10. This cable routing example thus defines the length of the flexible component 18 while the segments 60, 62 are freely slidable along the cable 64. The end segment 66 limits movement of the segments 60, 62 at one end of the flexible component 18 and a cable loop limits movement of the segments 60, 62 at the other or distal end of the flexible component 18.

Other cable routing variations are contemplated. For example, a single bore 61 can be provided through each segment 60, 62 and the cable 64 can pass only once throughout the length of the flexible component 18. In this case, a swaging or other cable locking technique can be utilized at each end of the flexible component 18. More than two cable runs can also be accomplished by having additional segment bores 61. The cable 64 can be connected to any one or more end segments 66 as desired. The cable 64 can also be connected with any one or more of the segments 60, 62 if desired to limit segment movement at any point along the cable 64. Other cable and segment clamping techniques can be used including utilizing other mechanical clamps or fasteners, adhesives, or bonding or welding techniques.

The flexible component 18, 24 can also be coated with or provided within a flexible material. An advantage of providing a flexible material, such as PVC, over the length of the flexible component 18, 24 is that noise is reduced when climbing the platforms 10 and 22. Such a material could allow the desired flexibility in a single plane, as above, and can help limit movement in other directions. Such a material can facilitate easier sliding of the flexible component 18, 24 over tree bark. Materials other than PVC are contemplated including other polymeric materials including natural and synthetic rubbers and the like. The material preferable does not significantly affect the flexibility of the flexible component 18, 24 in the single plane.

Other manners of adjusting one end of the flexible component 18, 24 relative to a structural component of a platform 10, 22, such as arm 14 or 34, are also contemplated instead of utilizing a spring pin 20, 50 to be inserted within a hole 27 of a segment 62. For example, a movable fork element can be guided and operatively connected with an arm 14, 34 to engage between adjacent segments 60. Other locking mechanisms can likewise be operatively connected with an arm or other structural component of a platform to engage and lock any segment, such as comprising clamps or other mechanical fasteners. Adjustability can be provided by any mechanism for engaging and disengaging with a segment.

What is claimed is:

1. A climbing tree stand comprising:
   a first platform including a tree engaging portion and a pair of structural support arms extending at a desired angle from the first platform at two spaced locations, and
   a first flexible component that is operatively connected to one arm of the first platform and adjustably connectable with the other arm, the first flexible component comprising a first inner cable onto which a plurality of rigid segments are threaded so as to be freely slidable on the first inner cable, wherein the segments are sufficiently provided along the first inner cable and shaped to allow for the flexible component to be flexible in a desired plane but otherwise sufficiently rigid, based on interaction of the plural segments with one another, for substantially maintaining the flexible component at the desired angle of the arms to the first platform, wherein said plurality rigid segments comprises
   a combination of a plurality of holed and non-holed segments arranged along the first inner cable, wherein the other arm includes an internal passage within which an end portion of the first flexible component can slide for providing an adjustable connection between the first flexible component and the other arm, the other arm also being operatively connected with a movable element to selectively engage within a selected hole of said holed segments of the first flexible component.

2. The tree stand of claim 1, wherein the other arm includes an internal passage within which an end portion of the first flexible component can slide for providing an adjustable connection between the first flexible component and the other arm, the other arm also being operatively connected with a movable element to selectively engage with a segment of the first flexible component.

3. The tree stand of claim 1, wherein the arms are each pivotally connected with the first platform and a further structural support is connected between the first platform at a spaced location from the arms and ends of the arms for maintaining the arms at the desired angle from the first platform.

4. The tree stand of claim 3, wherein the further structural support is pivotally connected with the ends of the arms and is detachably connected with the first platform to allow the arms and further structural support to collapse relative to the first platform when detached.

5. The tree stand of claim 1, wherein the first inner cable is threaded to run through each of the segments of the first flexible component more than once.

6. The tree stand of claim 5, wherein the first inner cable is connected to an end segment provided at one end of the first flexible component at each end of the first inner cable.

7. The tree stand of claim 1, further comprising a second platform including a tree engaging portion and a pair of structural support arms extending at a desired angle from the seat platform at two spaced locations, and a second flexible component that is operatively connected to one arm of the second platform and adjustably connectable with the other arm, the second flexible component comprising a second inner cable onto which a plurality of rigid segments are threaded so as to be freely slidable on the second inner cable, wherein the segments are sufficiently provided along the second inner cable and shaped to allow for the flexible component to be flexible in a desired plane but otherwise sufficiently rigid, based on interaction of the plural segments with one another, for substantially maintaining the flexible component at the desired angle of the arms to the second platform.

8. The tree stand of claim 7, wherein the second flexible component comprises a combination of holed and non-holed segments arranged along the second inner cable.

9. The tree stand of claim 7, wherein the other arm connected with the second platform includes an internal passage within which an end portion of the second flexible component can slide for providing an adjustable connection between the second flexible component and the other arm connected with the second platform, the other arm connected with the second platform also being operatively connected with a movable element to selectively engage with a segment of the second flexible component.

10. The tree stand of claim 8, wherein the other arm connected with the second platform includes an internal passage within which an end portion of the second flexible component can slide for providing an adjustable connection between the second flexible component and the other arm connected with the second platform, the other arm connected with the second platform also being operatively connected with a movable element to selectively engage within a hole of a holed segment of the second flexible component.

11. The tree stand of claim 7, wherein the arms connected with the second platform are each pivotally connected with the second platform and a further structural support is connected between the second platform at a spaced location from the arms and ends of the arms for maintaining the arms at the desired angle from the second platform.

12. The tree stand of claim 11, wherein the further structural support is pivotally connected with the ends of the arms connected with the second platform and is detachably connected with the second platform to allow the arms and further structural support to collapse relative to the second platform when detached.

13. The tree stand of claim 7, wherein the second inner cable is threaded to run through each of the segments of the second flexible component more than once.

14. The tree stand of claim 13, wherein the second inner cable is connected to an end segment provided at one end of the second flexible component at each end of the second inner cable.

15. A climbing tree stand comprising:
a seat platform including a tree engaging portion and a pair of structural support arms extending at a desired angle from the seat platform at two spaced locations,
a first flexible component that is operatively connected to one arm of the seat platform and adjustably connectable with the other arm, the first flexible component comprising a first inner cable onto which a plurality of rigid segments are threaded so as to be freely slidable on the first inner cable, wherein the segments are sufficiently provided along the first inner cable and shaped to allow for the flexible component to be flexible in a desired plane but otherwise sufficiently rigid, based on interaction of the plural segments with one another, for substantially maintaining the flexible component at the desired angle of the arms to the seat platform, wherein said plurality rigid segments comprises
a combination of a plurality of holed and non-holed segments arranged along the first inner cable, wherein the other arm includes an internal passage within which an end portion of the first flexible component can slide for providing an adjustable connection between the first flexible component and the other arm, the other arm also being operatively connected with a movable element to selectively engage within a selected hole of said holed segments of the first flexible component,
a foot platform including a tree engaging portion and a pair of structural support arms extending at a desired angle from the seat platform at two spaced locations, and
a second flexible component that is operatively connected to one arm of the foot platform and adjustably connectable with the other arm, the second flexible component comprising a second inner cable onto which a plurality of rigid segments are threaded so as to be freely slidable on the second inner cable, wherein the segments are sufficiently provided along the second inner cable and shaped to allow for the flexible component to be flexible in a desired plane but otherwise sufficiently rigid, based on interaction of the plural segments with one another, for substantially maintaining the flexible component at the desired angle of the arms to the foot platform.

16. A method of making a tree stand comprising:
operatively connecting a seat platform including a tree engaging portion to a pair of structural support arms while extending the arms from the seat platform at two spaced locations;
threading a plurality of rigid segments onto a first inner cable so as to be slidable along the first inner cable and to create a first flexible component, wherein the segments are sufficiently provided along the first inner cable and shaped to allow for the first flexible component to be flexible in a desired plane but otherwise sufficiently rigid, based on interaction of the plural segments with one another, for substantially maintaining the first flexible component at a desired angle; and
attaching a first end of a first flexible component to one arm of the seat platform, wherein said plurality rigid segments comprises
a combination of a plurality of holed and non-holed segments arranged along the first inner cable, wherein the other arm includes an internal passage within which an end portion of the first flexible component can slide for providing an adjustable connection between the first flexible component and the other arm, the other arm also being operatively connected with a movable element to selectively engage within a selected hole of said holed segments of the first flexible component and adjustably connecting a second end of the first flexible component with the other arm by utilizing one of said of the hole of said holed segments.

17. The method of claim 16, further comprising the steps of:
operatively connecting a foot platform including a tree engaging portion to a pair of structural support arms while extending the arms from the foot platform at two spaced locations;
threading a plurality of rigid segments onto a second inner cable so as to be slidable along the second inner cable and to create a second flexible component, wherein the segments are sufficiently provided along the second inner cable and shaped to allow for the second flexible component to be flexible in a desired plane but otherwise sufficiently rigid, based on interaction of the plural segments with one another, for substantially maintaining the second flexible component at a desired angle; and attaching a first end of a second flexible component to one arm of the foot platform and adjustably connecting a second end of the second flexible component with the other arm.

\* \* \* \* \*